(12) United States Patent
Maeda et al.

(10) Patent No.: US 8,743,568 B2
(45) Date of Patent: Jun. 3, 2014

(54) CURRENT SUPPLY CIRCUIT, POLYPHASE DRIVE CIRCUIT, METHOD OF DESIGNING CURRENT SUPPLY CIRCUIT

(75) Inventors: Toshiyuki Maeda, Shiga (JP); Masanobu Tomoe, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/582,936

(22) PCT Filed: Dec. 15, 2004

(86) PCT No.: PCT/JP2004/018732
§ 371 (c)(1),
(2), (4) Date: Jun. 15, 2006

(87) PCT Pub. No.: WO2005/060082
PCT Pub. Date: Jun. 30, 2005

(65) Prior Publication Data
US 2007/0139978 A1    Jun. 21, 2007

(30) Foreign Application Priority Data
Dec. 16, 2003  (JP) .................................. 2003-418283

(51) Int. Cl.
*H02M 5/458* (2006.01)
(52) U.S. Cl.
USPC .................................. 363/37; 363/51; 363/61
(58) Field of Classification Search
USPC ....................... 363/35, 61, 37, 51, 34; 307/110
See application file for complete search history.

(56) References Cited

U.S. PATENT DOCUMENTS 6,550,290 B2 *   4/2003   Shimakage et al. ......... 68/12.04

FOREIGN PATENT DOCUMENTS

| JP | 60-249895 A |   | 12/1985 |
| JP | 04-359890   | * | 12/1992 |
| JP | 9-180895 A  |   | 7/1997  |
| JP | 10-150776 A |   | 6/1998  |
| JP | 11-136994 A |   | 5/1999  |
| JP | 2000-32773 A|   | 1/2000  |
| JP | 2002-165464 A|  | 6/2002  |
| JP | 2003-143871 |   | 5/2003  |

OTHER PUBLICATIONS

Toshiba International Corporation, Application Guideline 15, Reliability Against Votage and Current wrt ASD's, Jan. 2, 2003, pp. 1-3.*
Mitsubishi Semiconductor Power Modules MOS, Application Note, Using Intelligent Power Modules, Sep. 1998, pp. 1-31.*

(Continued)

*Primary Examiner* — Harry Behm
(74) *Attorney, Agent, or Firm* — Birch, Stewart, Kolasch & Birch, LLP.

(57) ABSTRACT

Losses are reduced in a current supply circuit including an inverter having a switching element. The dynamic losses in an IGBT element including a free wheeling diode are proportional to the product of turn-on losses and a switching frequency, and the static losses are proportional to the product of a current flowing through the IGBT element and a saturation voltage across a collector and an emitter of the IGBT element. When the breakdown voltage of the IGBT element is increased twice, the saturation voltage across a collector and an emitter does not reach twice as much. Therefore, the static losses can be reduced by increasing a voltage twice and reducing a current by half that are supplied to a load to attain the same power to supplied to the load, with the same dynamic losses.

3 Claims, 7 Drawing Sheets

(56) References Cited

OTHER PUBLICATIONS

Mitsubishi Semiconductor Power Modules MOS, Application Note, General Considerations for IGBT and Intelligent Power Modules, Sep. 1998, pp. 1-18.*

Patent Abstracts of Japan, Patent Abstract of JP04-359890, Dec. 14, 1992, pp. 1-2.*

Yamashita et al., Power Semiconductor Devices and IC's., 1997 IEEE International Symposium, May 26-29, 1997, pp. 109-112.

Satoshi Mori, Latest IPM Technique and Application Examples Thereof, text of 13th technical seminar of Japan Society of Power Electronics, p. 38 (1998).

Noriyoki Iwamuro, Tadashi Miyasaka, Yasukazu Seki, "Technical innovation in U-series IGBT Module", Fuji Electric Journal, vol. 75, No. 10, p. 555 (2002).

Junji Yamada, et al., "Low Turn-Off Switching Energy 1200V IGBT Module" 2002 IEEE.

"Guide to Practical Ise of Mitsubishi Power Module MOS" p. 46, Mitsubishi Electric.

Mohan, et al., "Power Electronics: Converters, Applications and Design", 1989, Wiley & Sons, New York, XP002571888, ISBN: 0471505374, pp. 435-450 and pp. 607-621.

* cited by examiner

F I G . 1
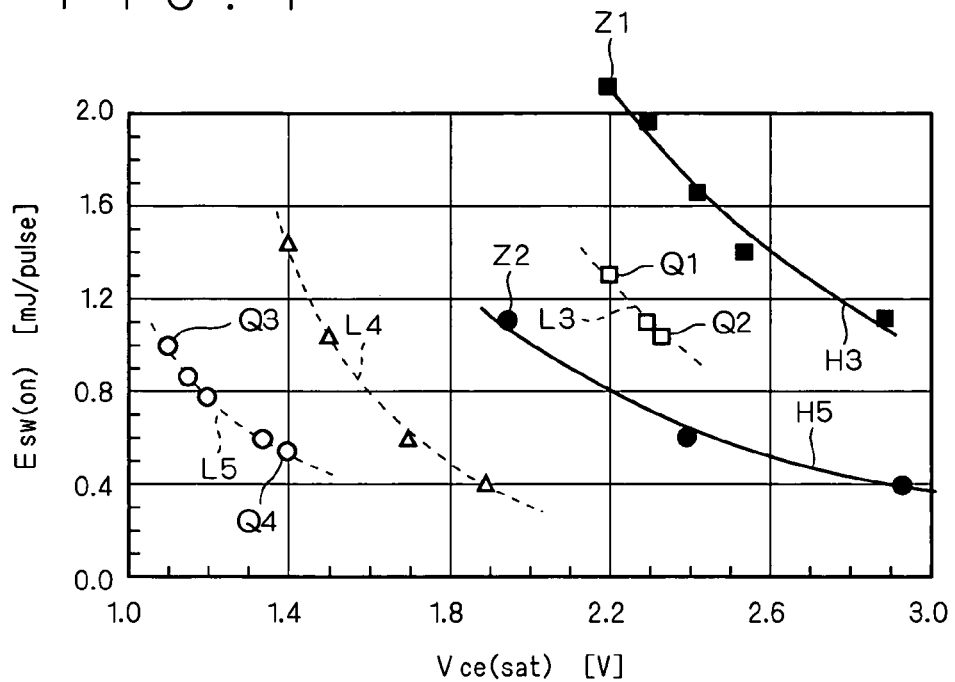
F I G . 2
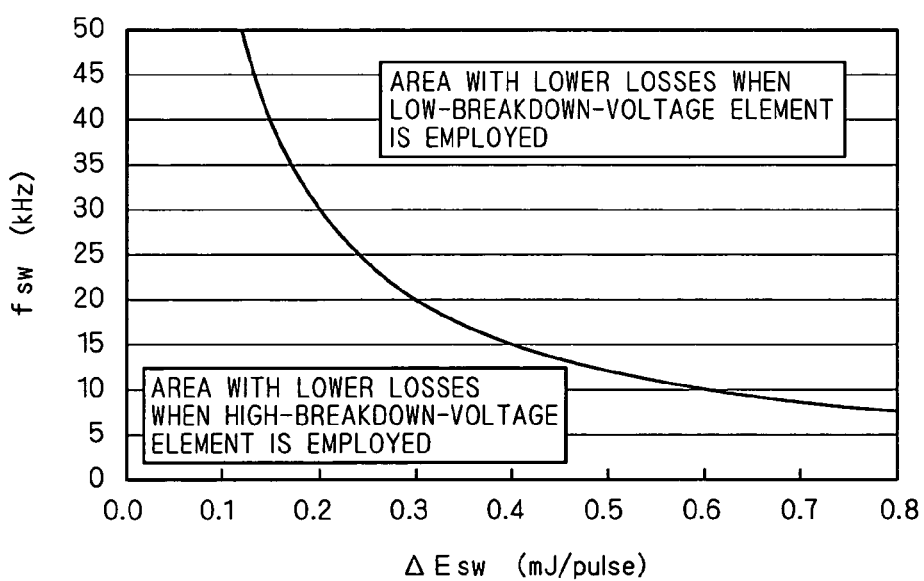

F I G. 1 1
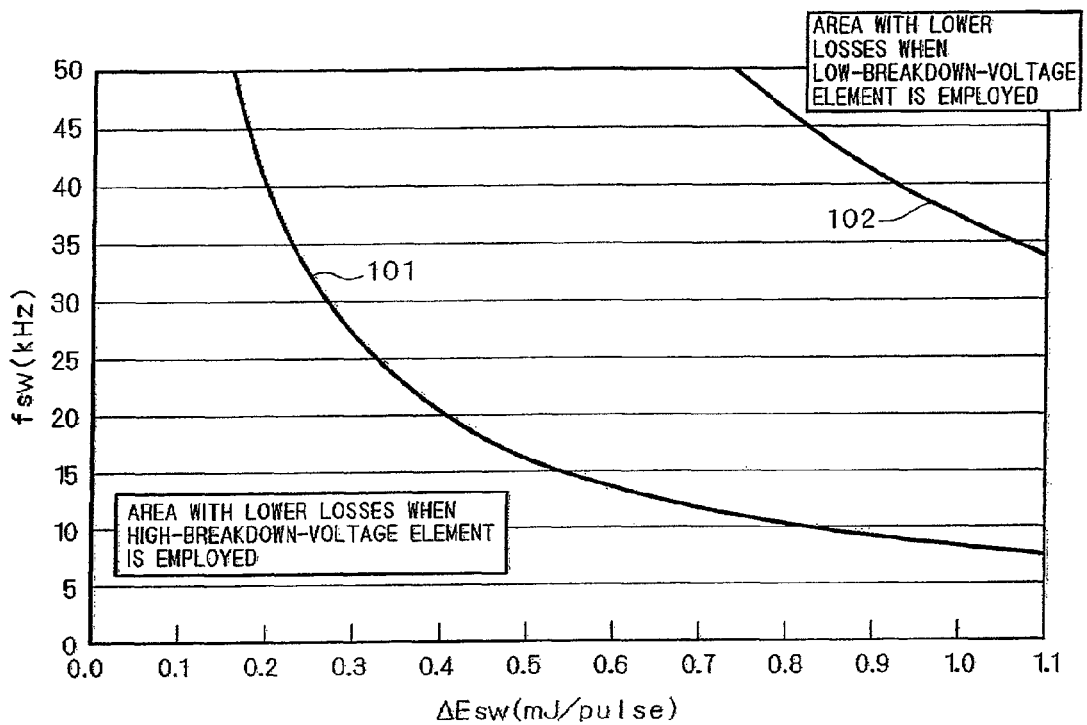
F I G. 1 2 "CONVENTIONAL ART"
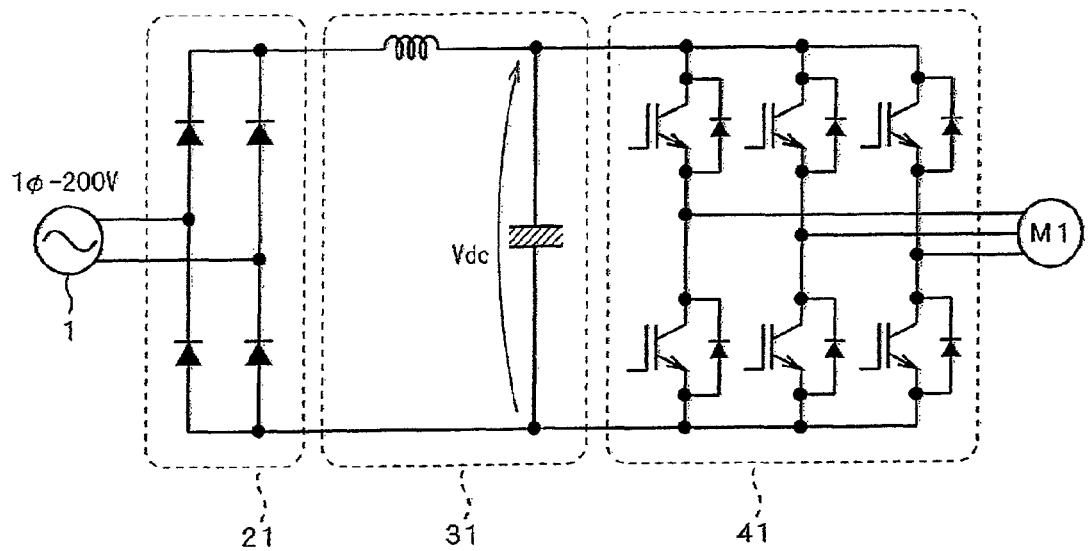

F I G . 1 3 "CONVENTIONAL ART"
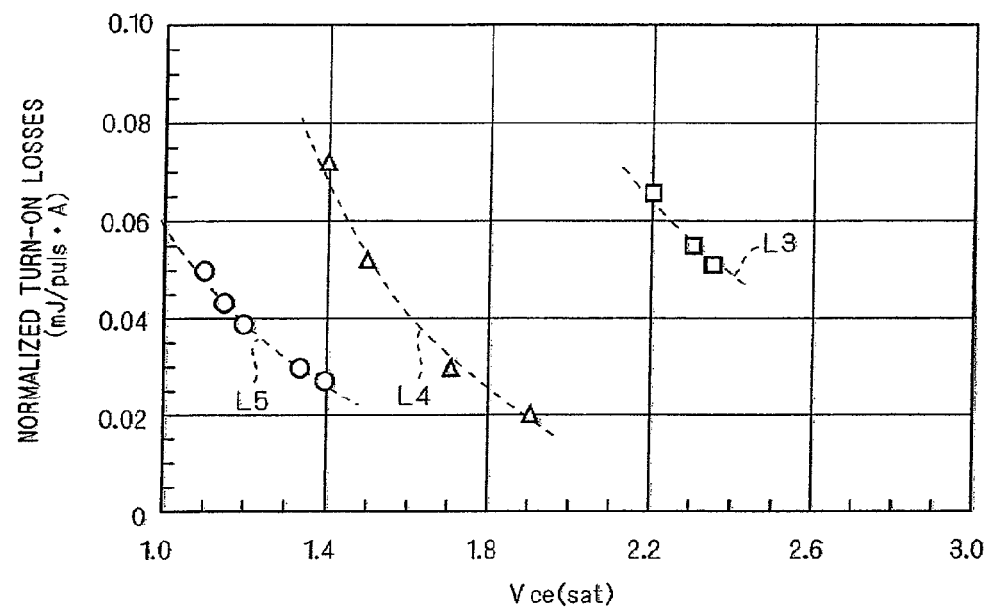

CURRENT SUPPLY CIRCUIT, POLYPHASE DRIVE CIRCUIT, METHOD OF DESIGNING CURRENT SUPPLY CIRCUIT

TECHNICAL FIELD

The present invention relates to techniques for supplying polyphase current.

Background Art

FIG. 12 is a circuit diagram illustrating a conventional current-supplying technique. A diode bridge 21 applied with an AC voltage having an effective value of 200 V from an AC power supply 1, or a single-phase 200 V power supply, performs full-wave rectification, and provides an inverter 41 with a DC voltage Vdc via a smoothing circuit 31. The inverter 41 includes series connection of two IGBT (Insulated Gate Bipolar Transistor) elements having a breakdown voltage of 600 V for each phase, and outputs an AC current of each phase from a node of the series connection to a three-phase motor M1.

To suppress losses in the inverter 41, it is desired to reduce turn-on losses and a saturation voltage across a collector and an emitter of each IGBT element, since their characteristic values have influences on dynamic losses and static losses in the IGBT element, respectively.

Meanwhile, improvements in fine structure of an IGBT element are classified as generational differences. FIG. 13 shows the relationship between turn-on losses and a saturation voltage Vce(sat) across a collector and an emitter in regard to third-generation, fourth-generation, and fifth-generation IGBT elements having a breakdown voltage of 600 V, as graphs L3, L4, and L5, respectively. The turn-on losses are normalized in terms of the number of pulses and current. It is shown that although a tradeoff exists between their characteristic values, both of the characteristic values decrease with each new generation.

Such characteristics of IGBT elements of different generations are discussed in non-patent documents 1 to 3, for instance, and the losses in an IGBT element based on the turn-on losses and a saturation voltage across a collector and an emitter are discussed in non-patent document 4. Patent document 1 discloses a technique for controlling a motor used in an air conditioner or a cooling device. Patent document 2 discloses a technique for modularizing an inverter unit and a converter unit.

Non-Patent Document 1: Satoshi Mori, "Latest IPM Technique and Application Examples Thereof", text of 13$^{th}$ technical seminar of Japan Society of Power Electronics, p38 (1998)

Non-Patent Document 2: Noriyuki Iwamuro, Tadashi Miyasaka, Yasukazu Seki, "Technical Innovation in U-series IGBT Module", Fuji Electric Journal, vol. 75, No 10, p555 (2002)

Non-Patent Document 3: Junji Yamada, et al., "Low Turn-Off Switching Energy 1200V IGBT Module" [online], IEEE, [searched Oct. 8, 2003], Internet <URL:http://www.inel-tron.de/english/Low_turn_off_5th_genIGBT.pdf>

Non-Patent Document 4: "Guide to Practical Use of Mitsubishi Power Module MOS" p46, [online], Mitsubishi Electric, [searched Oct. 8, 2003], Internet <URL:http://semi-con.melco.co.jp/semicon/html/pdf/ka0350a3, pdf>

Patent Document 1: Japanese Patent Application Laid-Open No. 60-249895

Patent Document 2: Japanese Patent Application Laid-Open No. 2003-143871

DISCLOSURE OF INVENTION

There has naturally been a demand for losses reduction in each IGBT element without a wait for a new generation IGBT element.

In view of such demand, the present invention has an object to provide a technique for reducing losses in a current supply circuit including an inverter having an IGBT element.

A current supply circuit according to the invention includes a voltage doubler rectifying circuit (22) connected to an AC 200 V system power supply (1), and a polyphase inverter circuit (42) including series connection of two switching elements having a breakdown voltage of 1200 V for each phase, and outputting an AC current of each phase from a node of the series connection.

The switching element is an IGBT element, for example.

Preferably, the voltage doubler rectifying circuit and the polyphase inverter circuit are modularized.

A polyphase drive circuit according to the invention includes the current supply circuit according to the invention, and a polyphase motor for 400 V (M2) supplied with current from the polyphase inverter circuit.

A method of designing a current supply circuit according to the invention is a method of designing a current supply circuit (22, 32, 42) applied with an AC voltage of a predetermined effective value voltage to output a polyphase AC current to a polyphase load (M2) of a predetermined rated power. The current supply circuit includes a polyphase inverter circuit (42), the polyphase inverter circuit including series connection of two switching elements for each phase, and outputting the AC current of each phase from a node of the series connection.

A first aspect of this method includes the steps of (a) setting a current value as a rated current value of the polyphase inverter circuit, the current value being obtained by dividing the rated power of the polyphase load by a voltage value being twice the effective value voltage (S21), and (b) selecting the switching element having a second breakdown voltage based on the rated current value, the second breakdown voltage being twice a first breakdown voltage required of the switching element when a DC voltage obtained by performing full-wave rectification on the AC voltage is input to the polyphase inverter circuit (S25).

The AC voltage of the predetermined effective value voltage is a single phase, and the current supply circuit further includes a voltage doubler rectifying circuit (22) performing voltage doubler rectification on the AC voltage of the predetermined effective value voltage to output a rectified voltage to the polyphase inverter circuit (42).

The switching element is an IGBT element, for example.

In a second aspect of the method of designing a current supply circuit according to the invention, in the step (b) of the method of designing a current supply circuit according to the first aspect, as a switching frequency (fsw) of the inverter increases, the switching element is selected in a range with low turn-on losses (Esw(on)) in the rated current value.

In a third aspect of the method of designing a current supply circuit according to the invention, the step (b) of the method of designing a current supply circuit according to the second aspect further includes the steps of: (b-1) setting turn-on losses (Esw(on)=Esw/2) based on dynamic losses (Psw) required in regard to the switching element and the switching frequency (fsw) of the inverter; and (b-2) selecting the switching element that has the second breakdown voltage and produces almost the same turn-on losses as the turn-on losses in the rated current value set in the step (b-1).

The switching element is an IGBT element, for example. In the step (b), an increment ($\Delta$Esw) of turn-on losses in rated current value of the IGBT element having the second breakdown voltage with reference to turn-on losses (EL) in rated current value of the IGBT element having the first breakdown voltage is defined as a divisor, the product of a first value, a second value, and a third value is defined as a dividend, the first value (VL−$\Delta$Vce) being obtained by subtracting an increment ($\Delta$Vce) of a saturation voltage of the IGBT element having the second breakdown voltage with reference to a saturation voltage (VL) of the IGBT element having the first breakdown voltage from the saturation voltage (VL), the second value (Icp) being a maximum value of an output current of the inverter in terms of sinusoidal wave, and the third value being ($\pi$/16). The IGBT element having the second breakdown voltage is selected in an area with a lower switching frequency (fsw) of the inverter than the result obtained by dividing the dividend by the divisor.

Alternatively, when the current supply circuit further includes a voltage doubler rectifying circuit (22) performing voltage doubler rectification on the AC voltage of the predetermined effective value voltage to output a rectified voltage to the polyphase inverter circuit (42), the switching element is an IGBT element. In the step (b), an increment ($\Delta$Esw), multiplied by a factor of (2/$\pi$), of turn-on losses in rated current value of the IGBT element having the second breakdown voltage with reference to turn-on losses (EL) in rated current value of the IGBT element having the first breakdown voltage is defined as a divisor, a value is defined as a dividend, the value (Pd+(VL−$\Delta$Vce)·Icp/8) being obtained by adding losses (Pd) for one diode included in the voltage doubler rectifying circuit (22) to the product of a first value, a second value, and a third value, the first value (VL−$\Delta$Vce) being obtained by subtracting an increment ($\Delta$Vce) of a saturation voltage of the IGBT element having the second breakdown voltage with reference to a saturation voltage (VL) of the IGBT element having the first breakdown voltage from the saturation voltage, the second value (Icp) being a maximum value of an output current of the inverter in terms of sinusoidal wave, and the third value being (⅛), and the IGBT element having the second breakdown voltage is selected in an area with a lower switching frequency (fsw) of the inverter than the result obtained by dividing the dividend by the divisor.

In a fourth aspect of the method of designing a current supply circuit according to the invention, the inverter has the switching frequency (fsw) set to 7 kHz or less in the method of designing a current supply circuit according to the second aspect.

Preferably, in the methods of designing a current supply circuit according to the first to fourth aspects, the predetermined effective value voltage is 200 V, and the first breakdown voltage is 600 V.

When a polyphase AC current is obtained by an inverter based on an AC 200 V power supply, losses can be reduced by employing a 1200 V IGBT element as in the current supply circuit according to the invention. This in turn allows losses reduction in a polyphase drive circuit including the current supply circuit.

By modularizing the voltage doubler rectifying circuit and the polyphase inverter circuit, the lines between them are insulated from the surroundings with a high breakdown voltage.

According to the first aspect of the method of designing a current supply circuit of the invention, a voltage applied to a polyphase load can be increased twice by increasing the breakdown voltage of the IGBT element twice, and the rated power of the polyphase load is not deviated by reducing the rated current value by half. Moreover, when the breakdown voltage of the IGBT element is increased twice, the saturation voltage across a collector and an emitter does not reach twice as much. Therefore, when compared with an IGBT element having the first breakdown voltage, an IGBT element having the second breakdown voltage can be selected to reduce static losses (IcpVce(sat)/4) with the same dynamic losses (2Esw(on)·fsw/$\pi$).

According to the second aspect of the method of designing a current supply circuit of the invention, the dynamic losses (2Esw(on)·fsw/$\pi$) of the IGBT element can be reduced.

When the breakdown voltage of the IGBT element is increased twice, the saturation voltage across a collector and an emitter does not reach twice as much. Therefore, according to the third aspect of the method of designing a current supply circuit of the invention, when compared with an IGBT element having the first breakdown voltage, an IGBT element having the second breakdown voltage can be selected to reduce static losses (IcpVce(sat)/4) with the same dynamic losses (2Esw(on)·fsw/$\pi$).

In current IGBT elements, the turn-on losses in rated current value set in the step (a) for the IGBT element having the second breakdown voltage is not greater than the turn-on losses in doubled rated current value set in the step (a) for the IGBT element having the first breakdown voltage by 0.4 mJ/pulse or more. Therefore, according to the fourth aspect of the method of designing a current supply circuit of the invention, static losses are reduced by a greater amount than an increase in dynamic losses by employing the IGBT having the second breakdown voltage than by employing the IGBT having the first breakdown voltage, to be reduced as the whole losses in the IGBT element.

These and other objects, features, aspects and advantages of the present invention will become more apparent from the following detailed description and the accompanying drawings.

BRIEF DESCRIPTION OF DRAWINGS

FIG. 1 shows graphs indicating the relationships between turn-on losses Esw(on) and a saturation voltage Vce(sat) across a collector and an emitter in IGBT elements having breakdown voltages of 600 V and 1200 V.

FIGS. 2 to 5 are graphs showing an area where it is desirable to employ a high-breakdown-voltage element.

FIG. 11 is a graph showing an area where it is desirable to employ a high-breakdown-voltage element.

FIG. 12 is a circuit diagram illustrating a conventional current-supplying technique.

FIG. 13 shows graphs indicating the relationships between turn-on losses and a saturation voltage Vce(sat) across a collector and an emitter in IGBT elements having a breakdown voltage of 600 V.

BEST MODES FOR CARRYING OUT THE INVENTION

A: Basic Idea of the Invention

Figure 3:
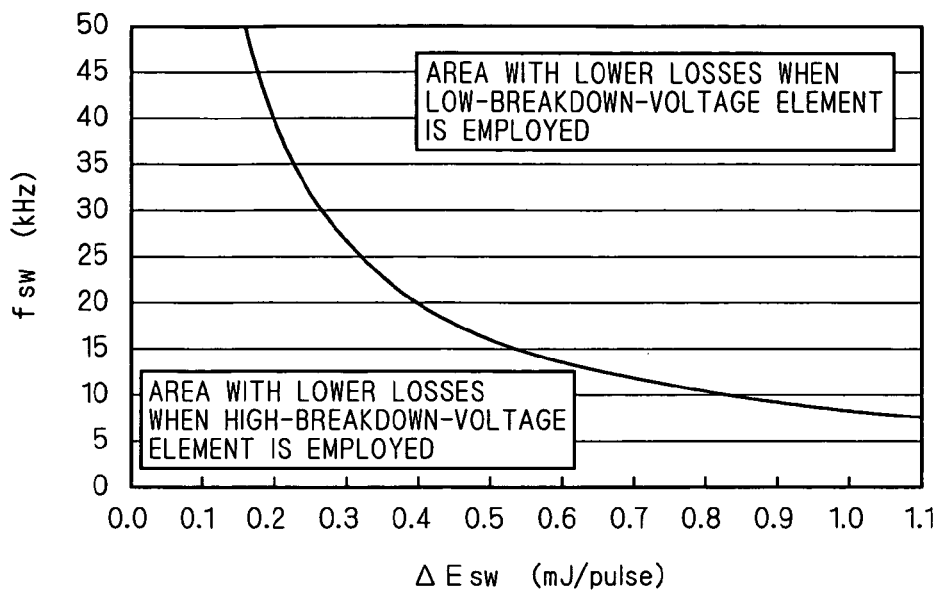

The basic idea of the present invention will be explained before giving detailed descriptions of preferred embodiments. This idea is of course part of the invention.

(A1) Losses in IGBT Element

According to the above-mentioned non-patent document 4, the total losses PQ in the body of an IGBT element are equal to the sum of static losses PSS and dynamic losses PSW, and expressed by Equation (1). The static losses PSS and dynamic losses PSW are expressed by Equations (2) and (3).

[Numeral 1]

$$PQ = PSS + PSW \qquad (1)$$

[Numeral 2]

$$PSS = Icp \cdot Vce(sat) \cdot \frac{1}{2\pi} \int_0^\pi \sin^2 x \cdot \frac{1 + \sin(x+\theta) \cdot D}{2} dx \qquad (2)$$

$$= Icp \cdot Vce(sat) \cdot \left(\frac{1}{8} + \frac{D}{3\pi}\cos\theta\right)$$

[Numeral 3]

$$PSW = (Esw(\text{on}) + Esw(\text{off})) \cdot fsw \cdot \frac{1}{2\pi} \int_0^\pi \sin x\, dx \qquad (3)$$

$$= (Esw(\text{on}) + Esw(\text{off})) \cdot fsw \cdot \frac{1}{\pi}$$

Introduced into the above Equations are turn-on switching losses $Esw(\text{on})$ per pulse of the IGBT element, turn-off switching losses $Esw(\text{off})$ per pulse, a switching frequency of the IGBT element (namely, a carrier frequency of an inverter for which the IGBT element is employed) $fsw$, a maximum value $Icp$ of output current in terms of sinusoidal wave, a saturation voltage $Vce(sat)$ across a collector and an emitter of the IGBT element, duty $D$, and a power factor $\cos\theta$ of the output sinusoidal wave.

Further in consideration of static losses PD in a free wheeling diode typically added to an IGBT element, losses PA in the whole IGBT element are expressed by Equation (4). The static losses PD in the free wheeling diode are expressed by Equation (5), where a forward voltage drop Vec with the current flow of the maximum value Icp is introduced.

[Numeral 4]

$$PA = PQ + PD = PSS + PSW + PD \qquad (4)$$

[Numeral 5]

$$PD = Icp \cdot Vec \cdot \left(\frac{1}{8} - \frac{D}{3\pi}\cos\theta\right) \qquad (5)$$

It has been known experimentally that the turn-on switching losses $Esw(\text{on})$ and turn-off switching losses $Esw(\text{off})$ are almost the same, and that the saturation voltage $Vce(sat)$ across a collector and an emitter of the IGBT element and the forward voltage drop Vec of the free wheeling diode are almost the same. Thus, Equation (4) can be expressed as Equation (6).

[Numeral 6]

$$PA = \left(\frac{2}{\pi}\right) \cdot Esw(\text{on}) \cdot fsw + \left(\frac{1}{4}\right) \cdot Icp \cdot Vce(sat) \qquad (6)$$

In the present specification, therefore, the first and second terms on the right side of Equation (6) shall be referred to as dynamic losses and static losses in the IGBT element, respectively.

(A2) Rated Power of Load and Breakdown Voltage of IGBT Element

The amount of work by a load supplied with current from an inverter is proportional to its rated power. Put another way, two loads having the same rated power can achieve almost the same amounts of work. For instance, a motor having a rated voltage of 200V and a motor having a rated voltage of 400 V can, when having the same rated power of 2 kW, have almost the same product of torque and the number of revolutions so long as within the bounds of the ratings. That is, in regard to the amount of work required, the rated voltages of loads to achieve that amount of work can be selected with a degree of freedom.

The dynamic losses in IGBT as expressed by the first term on the right side of Equation (6) are independent of the rated voltage of a load. On the other hand, the static losses in IGBT as expressed by the second term on the right side of Equation (6) depend on the rated voltage of a load. More specifically, when loads are required of the same amounts of work, the current value Icp is inversely proportional to the rated voltages of the loads, and thus the static losses are also inversely proportional to the rated voltages of the loads.

However, when the loads have different rated voltages although having the same rated power, an output stage of a current supply circuit for supplying current to the loads, a polyphase inverter circuit for instance, has different breakdown voltages. In the above example, when using the motor having a rated voltage of 200 V (rated power of 2 kW), an IGBT element having a breakdown voltage of 600 V is employed for an inverter. Accordingly, when using the motor having a rated voltage of 400 V (rated power of 2 kW), an IGBT element having a breakdown voltage of 1200 V shall be employed for an inverter.

(A3) Improvement in Static Losses

The static losses in an IGBT element are inversely proportional to the rated voltage of a load, as described above. The static losses in an IGBT element are therefore improved if an IGBT element that is employed when the rated voltage of the load is multiplied k-fold (hereafter also referred to as a "high-breakdown-voltage element") has a saturation voltage Vce(sat) across a collector and an emitter of less than k-fold. When the dynamic losses in the high-breakdown-voltage element are equal to or less than the dynamic losses in an IGBT element that is employed under normal conditions (hereafter also referred to as a "low-breakdown-voltage element"), the losses PA in the whole IGBT element are improved as well.

Even when the dynamic losses in the high-breakdown-voltage element are bigger than the dynamic losses in the low-breakdown-voltage element, the whole losses PA are improved if the increment is compensated for by a decrease in static losses. Such losses reductions as the sum of static losses and dynamic losses will be described later. In this section, a description will be given mainly of a case where the dynamic losses in the high-breakdown-voltage element are set to the same as the dynamic losses in the low-breakdown-voltage element.

FIG. 1 shows graphs indicating the relationships between the turn-on losses Esw(on) and the saturation voltage Vce (sat) across a collector and an emitter in various IGBT elements having breakdown voltages of 600 V and 1200 V. The graphs L3, L4 and L5 for low-breakdown-voltage elements correspond to the graphs shown in FIG. 13, respectively. To incorporate the influence of the current value Icp, turn-on losses Esw(on) per pulse are shown upon passing a current having an effective value of 20 A (namely, Icp=28.2 (A)).

The graphs H3 and H5 are for third-generation and fifth-generation high-breakdown-voltage elements having a breakdown voltage of 1200 V, respectively. Assuming that a current flowing through the load is half the low-breakdown-voltage element, shown in the graphs are turn-on losses Esw (on) upon passing a current having an effective value of 10 A (namely, Icp=14.1 (A)). That is, each graph shows turn-on losses Esw(on) per pulse when the load has a rated power of about 6.9 kW.

When comparing the third generation high-breakdown-voltage and low-breakdown-voltage elements, with the turn-on losses Esw(on) being set to 1.12 (mJ/pulse), for instance, the low-breakdown-voltage element having a saturation voltage Vce(sat) of 2.3 (V) can be obtained. On the other hand, the high-breakdown-voltage element having a saturation voltage Vce(sat) of 2.9 (V) can be obtained, and this characteristic value does not reach twice (=1200/600) the value of the low-breakdown-voltage element. Therefore, a high-breakdown-voltage element capable of improving the static losses with the same dynamic losses can be obtained, thereby forming an inverter with low losses.

When comparing the fifth generation high-breakdown-voltage and low-breakdown-voltage elements, with the turn-on losses Esw(on) being set to 0.56 (mJ/pulse), for instance, the low-breakdown-voltage element having a saturation voltage Vce(sat) of 1.35 (V) can be obtained. On the other hand, the high-breakdown-voltage element having a saturation voltage Vce(sat) of 2.4 (V) can be obtained, and this characteristic value does not reach twice the value of the low-breakdown-voltage element. Therefore, a high-breakdown-voltage element capable of improving the static losses with the same dynamic losses can be obtained, thereby forming an inverter with low losses.

In such ways, when a comparison is made within the same generation, an output voltage can be increased by increasing the breakdown voltage of an IGBT element. Accordingly, with the load having a constant rated power, a current to be output for achieving the desired amount of work can be reduced, to thereby reduce the losses in the IGBT element and thus in an inverter for which the IGBT element is employed. This allows a reduction in inverter losses in IGBT elements of currently available generations, and further offers improvements in inverter losses with inexpensive IGBT elements of past generations.

More specifically, a high-breakdown-voltage element with k=2 can be selected as follows in consideration of Equation (6). The product of dynamic losses Psw required of an IGBT element in an inverter and π/2 is divided by a switching frequency fsw of the inverter, to be defined as turn-on losses Esw(on). In addition, the rated power of a load is divided by a voltage value twice the voltage effective value of a power supply and thereby to obtain a maximum value of the effective value of the output current of the inverter (rated current of the inverter: 10 A in the above example) for which the high-breakdown-voltage element is employed. Then, a high-breakdown-voltage element may be selected that produces almost the same turn-on losses as turn-on losses in the rated current of the inverter.

(A4) Compensation for Increase in Static Losses by Improvement in Dynamic Losses As can be understood from the first term on the right side of Equation (6), dynamic losses in an IGBT element are proportional to a switching frequency fsw. Thus, even when there is no other choice but to select a high-breakdown-voltage element whose saturation voltage Vce(sat) is twice or more of the saturation voltage Vce(sat) of a low-breakdown-voltage element, the losses PA in the whole IGBT element can be reduced. A switching frequency fsw, when being sufficiently small, compensates for an increase to some degree in static losses.

The specific extent of switching frequency fsw capable of reducing the losses PA in the whole IGBT element depends on how much the selected high-breakdown-voltage element increases in turn-on losses Esw(on) and saturation voltage Vce(sat) with reference to the low-breakdown-voltage element. To illustrate this, a description will given of how an increment ΔEsw of turn-on losses and an increment ΔVce of saturation voltage in an IGBT element (high-breakdown-voltage element) with reference to a certain generation IGBT element (low-breakdown-voltage element) have influences on the switching frequency fsw capable of reducing the losses PA in the whole IGBT element.

From Equation (6), losses PL and PH in a low-breakdown-voltage element and high-breakdown-voltage element supplying the same power to a load are expressed by Equations (7) and (8), respectively. It is assumed for brevity that an inverter using the high-breakdown-voltage element applies, when compared to an inverter using the low-breakdown-voltage element, a voltage with k being doubled to the load, and supplies a current with 1/k=½. The turn-on losses Esw(on) and saturation voltage Vce(sat) in the low-breakdown-voltage element are indicated as EL and VL, respectively.

[Numeral 7]

$$PL = \left(\frac{2}{\pi}\right) \cdot EL \cdot fsw + \left(\frac{1}{4}\right) \cdot Icp \cdot VL \tag{7}$$

[Numeral 8]

$$PH = \left(\frac{2}{\pi}\right) \cdot (EL + \Delta ESW) \cdot fsw + \left(\frac{1}{4}\right)\left(\frac{Icp}{2}\right) \cdot (VL + \Delta Vce) \tag{8}$$

Thus, a condition that satisfies PH<PL is expressed by Equation (9).

[Numeral 9]

$$\left(\frac{2}{\pi}\right) \cdot \Delta Esw \cdot fsw - \left(\frac{1}{8}\right) \cdot (VL - \Delta Vce) \cdot Icp < 0 \tag{9}$$

$$\therefore fsw < \left(\frac{\pi}{16}\right) \cdot (VL - \Delta Vce) \cdot Icp / \Delta Esw$$

A tradeoff between both characteristic values in regard to the high-breakdown-voltage element is approximated by Equation (10). For instance, constants A and B in Equation (10) are almost 13.8 and −2.39, respectively, in regard to the third-generation high-breakdown-voltage element, and the constants A and B in Equation (10) are almost 5.62 and −2.49, respectively, in regard to the fifth-generation high-breakdown-voltage element.

[Numeral 10]

$$VL + \Delta Vce = A \cdot (EL + \Delta Esw)^{-B} \quad (10)$$

Figure 4:
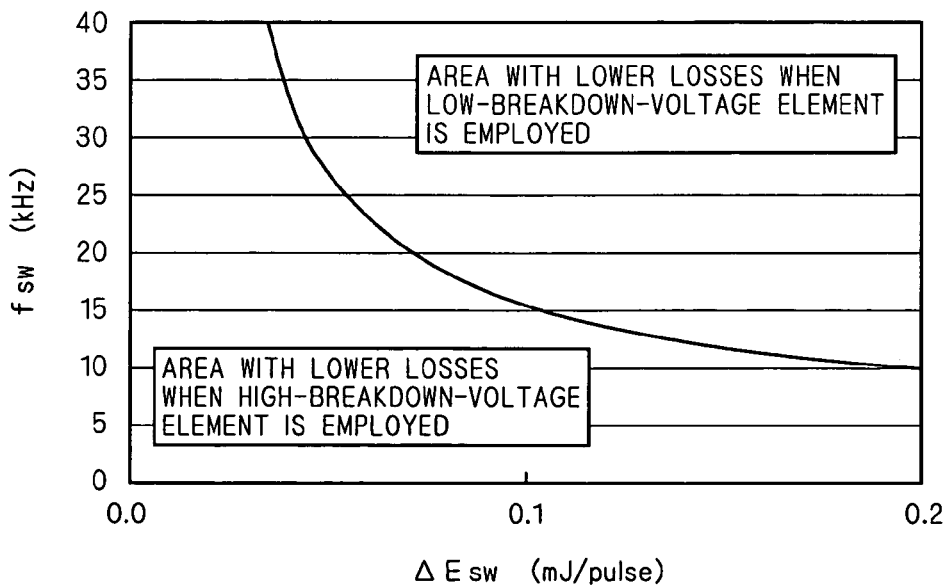
Figure 5:
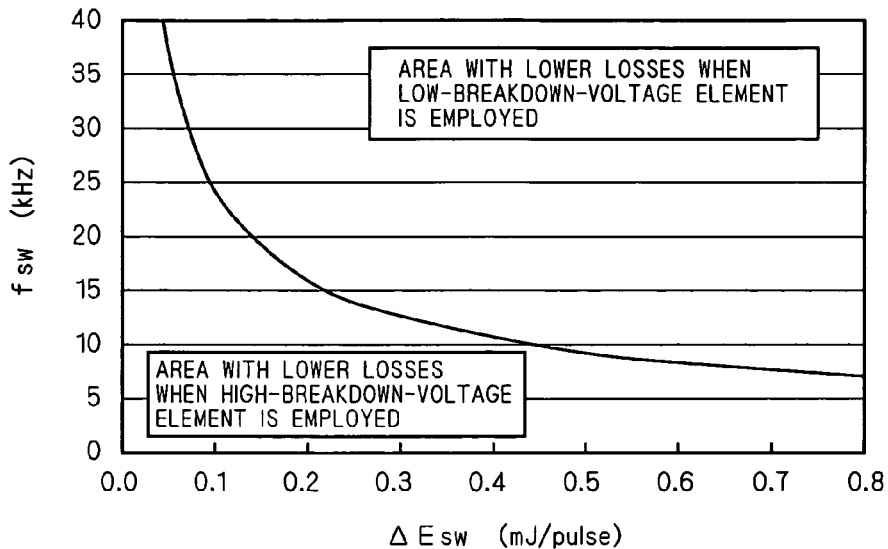

FIGS. 2 to 5 are graphs showing an area where it is desirable to employ a high-breakdown-voltage element based on Equations (9) and (10). FIGS. 2 and 3 concern the third generation, and FIGS. 4 and 5 concern the fifth generation. Selected for FIG. 2 is an IGBT element Q1 having turn-on losses EL and a saturation voltage VL of 1.30 (mJ/pulse) and 2.20 (V), respectively, and a breakdown voltage of 600 V. Selected for FIG. 3 is an IGBT element Q2 having turn-on losses EL and a saturation voltage VL of 1.04 (mJ/pulse) and 2.34 (V), respectively, and a breakdown voltage of 600 V. Selected for FIG. 4 is an IGBT element Q3 having turn-on losses EL and a saturation voltage VL of 1.00 (mJ/pulse) and 1.1 (V), respectively, and a breakdown voltage of 600 V. Selected for FIG. 5 is an IGBT element Q4 having turn-on losses EL and a saturation voltage VL of 0.54 (mJ/pulse) and 1.40 (V), respectively, and a breakdown voltage of 600 V.

In any of those instances, as the switching frequency fsw of the inverter increases, it is desirable to select a high-breakdown-voltage element in a range with a small increment $\Delta Esw$ of turn-on losses. Or to put it further, as the switching frequency fsw increases, it is desirable to select a high-breakdown-voltage element in a range with low turn-on losses Esw(on) in rated current. It is still further desirable that the increment $\Delta Esw$ of turn-on losses be negative (namely, the turn-on losses Esw(on) in the high-breakdown-voltage element be lower than the turn-on losses EL in the low-breakdown-voltage element).

When the switching frequency fsw is 7 kHz or less, the losses can be reduced substantially lower than when the low-breakdown-voltage element is used regardless of the turn-on losses in the high-breakdown-voltage element. The reason for this is as follows.

As shown in FIG. 1, a third-generation 1200 V IGBT element Z1 has turn-on losses Esw(on) of 2.10 mJ/pulse, and a difference from the turn-on losses in a 600 V IGBT element Q1 of the same generation is almost 0.8 mJ/pulse. A difference in turn-on losses between the IGBT element Z1 and a 600 V IGBT element Q2 of the same generation is almost 1.06 mJ/pulse. FIG. 2 concerning the IGBT element Q1 shows that the losses are smaller in the IGBT element having a breakdown voltage of 1200 V when an increment $\Delta Esw$ of turn-on losses is 0.8 mJ/pulse or less and the switching frequency fsw is 7 kHz. FIG. 3 concerning the IGBT element Q2 shows that the losses are smaller in the IGBT element having a breakdown voltage of 1200 V when an increment $\Delta Esw$ of turn-on losses is 1.10 mJ/pulse or less and the switching frequency fsw is 7 kHz.

Likewise, a fifth-generation 1200 V IGBT element Z2 has turn-on losses Esw(on) of 1.10 mJ/pulse, and a difference from the turn-on losses in a 600 V IGBT element Q3 of the same generation is almost 0.1 mJ/pulse. A difference in turn-on losses between the IGBT element Z2 and a 600 V IGBT element Q4 of the same generation is almost 0.56 mJ/pulse. FIG. 4 concerning the IGBT element Q3 shows that the losses are smaller in the IGBT element having a breakdown voltage of 1200 V when an increment $\Delta Esw$ of turn-on losses is 0.2 mJ/pulse or less and the switching frequency fsw is 7 kHz. FIG. 5 concerning the IGBT element Q4 shows that the losses are smaller in the IGBT element having a breakdown voltage of 1200 V when an increment $\Delta Esw$ of turn-on losses is 0.80 mJ/pulse or less and the switching frequency fsw is 7 kHz.

A motor used for compressing a refrigerant is typically not required of a quick response to changes in the number of rotations and torque, and causes no noticeable noise since a refrigerant compressor including the motor is often covered to be used. Thus, a low switching frequency fsw capable of realizing an inverter at low cost is employed. For instance, a switching frequency of almost 10 kHz or more is selected for a motor for a use that requires noise control. Meanwhile, a switching frequency is set to about 3 kHz for an outdoor air conditioner unit that is installed outside and soundproof, and for a refrigerator having a compressor supported by a coil. In such ways, the employment of a high-breakdown-voltage element is especially effective for an inverter that supplies current to a motor employed for a refrigerant compressor.

B: Description of Preferred Embodiment of the Invention

A preferred embodiment of the present invention will be described below, taking as an example an inverter that supplies current to a motor of a compressor of an air conditioner.

(B1) Losses Reduction in Inverter

Figure 6:
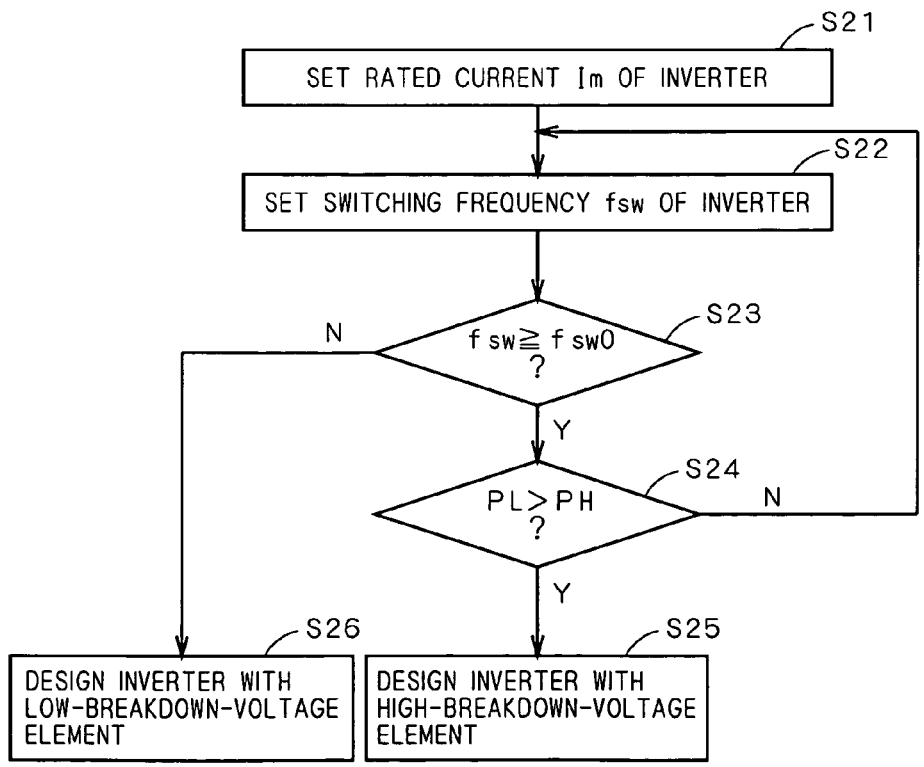
FIG. 6 is a flowchart illustrating a method of designing a current supply circuit according to the present invention.

FIG. 6 is a flowchart illustrating a method of designing a current supply circuit according to the present invention. In advance of designing the current supply circuit, a rated power G of the motor is predetermined based on the ability required of the compressor. Also known is an effective value voltage F of an AC power supply that is employed for driving the air conditioner including the motor and the inverter that supplies current to the motor.

First, at step S21, a maximum value of an effective value of a current supplied from the inverter (rated current of the inverter) Im is obtained based on the rated power G of the motor and the effective value voltage F of the AC power supply. This is specifically determined by Equation (11).

[Numeral 11]

$$Im = G/F/k\sqrt{3} \quad (11)$$

The constant k denotes a ratio between different selectable breakdown voltages in an IGBT element, and should be the same as k used in (A3). With IGBT elements of 600 V and 1200 V being selectable, for instance, k=b 2.

Processing then continues with step S22, to set a switching frequency fsw based on the followability and so on of motor control by the inverter. As described later, the switching frequency fsw is reduced each time this step is performed.

Step S23 is then performed to determine whether the switching frequency fsw is a predetermined minimum value fswo or more. The minimum value fswo is selected so that the above followability falls within a desirable range.

A description is given of when a positive determination is made at step S23. In such case, step S24 is subsequently performed to determine whether losses PH in a high-breakdown-voltage element are lower than losses PL in a low-breakdown-voltage element. Although specifics are omitted at step S24, the respective magnitudes of the losses PL and PH are determined by combining various low-breakdown-voltage elements and various high-breakdown-voltage elements.

When a positive determination is made at step S24, processing then continues with step S25, to design the inverter with high-breakdown-voltage elements.

When a negative determination is made at step S24, processing returns to step S22. As can be understood from the above explanation in "A: Basic Idea of the Invention", the lower the switching frequency fsw, the likelier it becomes to design the inverter using high-breakdown-voltage elements (see FIGS. 2 and 3, for example). Thus the switching frequency fsw to be set is reduced each time step S22 is performed. After that, a determination is made again at step S23.

When a negative determination is made at step S23, processing then continues with step S26, to design the inverter with low-breakdown-voltage elements.

As has been described, IGBT elements to be employed for the inverter are selected appropriately based on the rated power G of the motor and the effective value voltage F of the AC power supply, which allows the losses in the inverter to be reduced.

Current that may be passed from a high-breakdown-voltage element to be employed when designing the inverter with a high-breakdown-voltage element is smaller than current that may be passed from a high-breakdown-voltage element to be employed when designing the inverter with a low-breakdown-voltage element. In the above example, current that may be passed from the high-breakdown-voltage element is half the current that may be sent from the low-breakdown-voltage element. This requires a smaller chip area of the IGBT element, offering the advantage of cost reduction.

Of course, the rated voltage of a motor when designing the inverter with high-breakdown-voltage elements (step S25) is k-fold the rated voltage of a motor when designing the inverter with low-breakdown-voltage elements (step S26), which is twice in the above example (when the high-breakdown-voltage element has a breakdown voltage of 1200 V, and the low-breakdown-voltage element has a breakdown voltage of 600 V).

Figure 7:
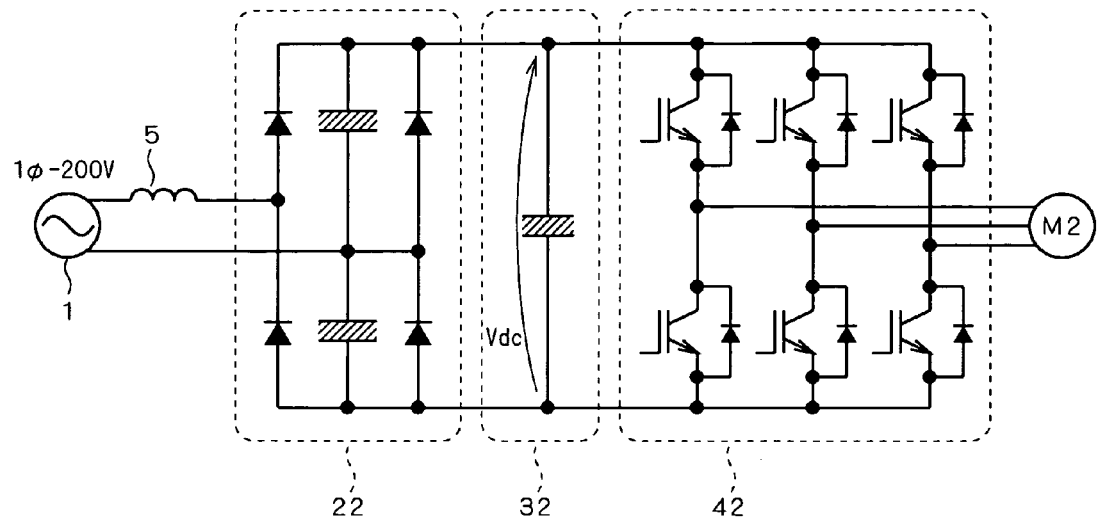
FIG. 7 is a circuit diagram illustrating a current-supplying technique using an inverter according to the present invention.

FIG. 7 is a circuit diagram illustrating a current-supplying technique with an inverter as designed above. A diode bridge (which includes voltage doubler capacitors) 22 applied with an AC voltage having an effective value of 200 V from an AC power supply 1, or a single-phase 200 V power supply, performs voltage doubler rectification, and provides an inverter 42 with a DC voltage Vdc via a smoothing circuit 32. The inverter 42 includes series connection of two IGBT elements having a breakdown voltage of 1200 V for each phase, and outputs an AC current of each phase from a node of the series connection to a three-phase motor M2.

As the diode bridge 22 includes the capacitors for performing voltage doubler rectification, a reactor 5 is disposed on the AC power supply 1 side with reference to the diode bridge 22 to realize choke input rectification in FIG. 7. Thus, unlike the smoothing circuit 31, the smoothing circuit 32 includes no reactor.

It was established by experiment that when a motor of a certain rated power produces a mechanical output of 3790 W in the vicinity of its rating, losses reduction of 28.5 W was found in the inverter 42 with respect to the inverter 41. In addition, when a motor of a certain rated power produces a mechanical output of 2770 W in the vicinity of its rating, losses reduction of 18.5 W was found in the inverter 42 with respect to the inverter 41.

Figure 8:
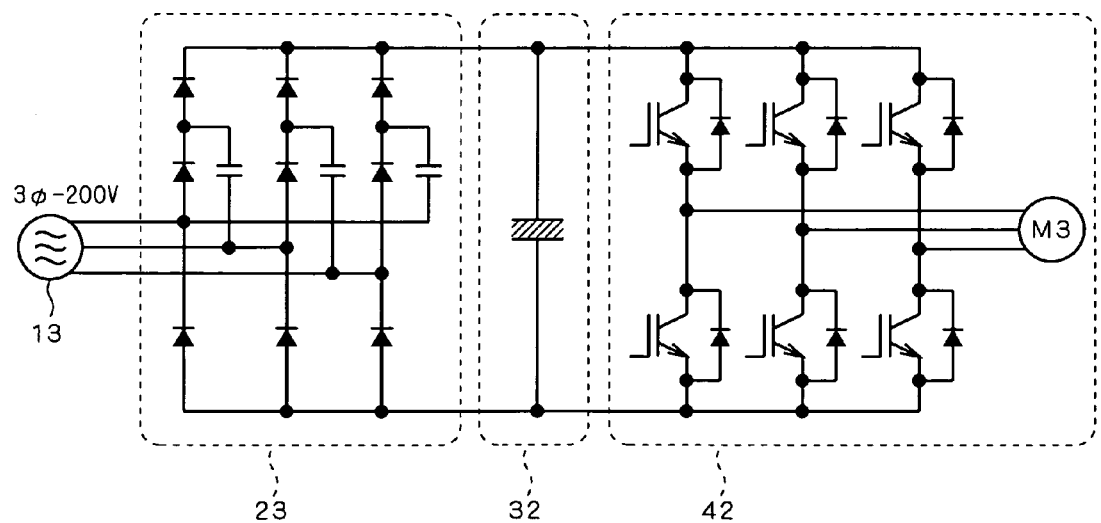
FIG. 8 is a circuit diagram illustrating the configuration of a three-phase voltage doubler circuit.

The present invention is applicable not only when a single-phase AC power supply is employed, but when a three-phase AC power supply is employed. FIG. 8 is a circuit diagram illustrating the configuration of a three-phase voltage doubler circuit. When compared with the circuit shown in FIG. 7, the single-phase AC power supply 1 and is replaced with a three-phase AC power supply 13, and the diode bridge 22 is replaced with a diode bridge 23. The diode bridge 23 includes three capacitors for performing voltage doubler rectification. Again in this case, a DC voltage subjected to voltage doubler rectification is supplied to the inverter 42 via the smoothing circuit 32. Therefore, the aforementioned effects can be obtained by applying the present invention to form the inverter 42 with high-breakdown-voltage elements.

The losses can be reduced further by the diode bridge 22 performing voltage doubler rectification than the diode bridge 21 performing full-wave rectification. This is because current passed from the AC power supply 1 always flows through two diodes in the diode bridge 21, whereas the diode bridge 22 includes capacitors for performing voltage doubler rectification and therefore includes only one diode in a current path from the AC power supply 1. Accordingly, looking at losses produced in a diode, the diode bridge 22 produces losses only half as much as the losses in the diode bridge 21.

Applying to the above experimental example, when a motor of a certain rated power produces a mechanical output of 3790 W in the vicinity of its rating, losses reduction of 25.7 W was found in the diode bridge 22 with respect to the diode bridge 21. In addition, when a motor of a certain rated power produces a mechanical output of 2770 W in the vicinity of its rating, losses reduction of 19.7 W was found in the diode bridge 22 with respect to the diode bridge 21.

The losses in the diode bridge are further explained in detail. Power losses Pd per diode can be estimated by the product of its forward voltage drop Vf and a DC current Idc output from a diode bridge to an inverter. In consideration of Equation (11), the power losses Pd are calculated by Equation (12).

[Numeral 12]

$$Pd = Vf \cdot Idc \qquad (12)$$
$$= Vf \cdot \frac{\sqrt{3}}{\sqrt{2}} \cdot Im$$
$$= G/(F \cdot k \cdot \sqrt{2})$$

In the diode bridge 21 performing full-wave rectification, where current passed from the AC power supply 1 always flows through two diodes as described above, the power losses are calculated to be 2Pd. On the other hand, in the diode bridge 22 performing voltage doubler rectification, where there is only one diode in a current path from the AC power supply 1, the power losses are calculated to be Pd.

Thus, the selection between a low-breakdown-voltage element or a high-breakdown-voltage element as an IGBT element in consideration of the losses in the diode bridge depends on, using the losses PL and PH in Equations (7) and (8), which one of PL+2Pd and PH+Pd is higher. Put another way, a high-breakdown-voltage element should be selected when Equation (13) holds true and a low-breakdown-voltage element should be selected when Equation (13) does not hold true, to reduce the sum of the respective losses in the diode bridge and in the inverter.

[Numeral 13]

$$PL > PH - Pd \qquad (13)$$

Figure 10:
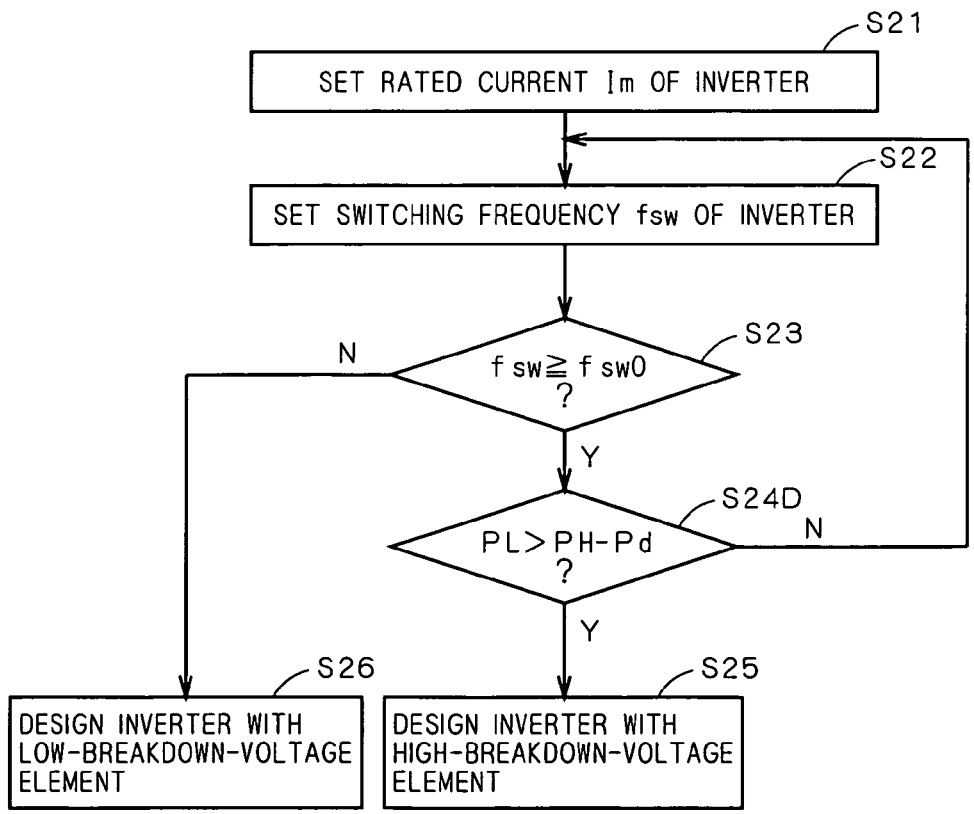
FIG. 10 is a flowchart illustrating a method of designing a current supply circuit according to the present invention.

FIG. 10 is a flowchart clarifying the above decision, which corresponds to FIG. 6. In the FIG. 10 flowchart, the step S24 in the FIG. 6 flowchart is replaced with step S24D to make a decision based on Equation (13).

FIG. 11 is a graph showing an area where it is desirable to employ a high-breakdown-voltage element in view of the sum of the respective losses in the diode bridge and in the inverter. Selected here is an IGBT element having turn-on losses EL and a saturation voltage VL of 1.04 (mJ/pulse) and 2.34 (V), respectively, and a breakdown voltage of 600 V, like the one described in regard to FIG. 3. Calculations were done by assuming that a forward voltage drop Vf is 1.5 V.

In an area nearer the origin side than a curve 102 is, the losses in the diode bridge and inverter can be reduced further when a high-breakdown-voltage element is employed than when a low-breakdown-voltage element is employed.

For comparison purposes, the graph shown in FIG. 3 reappears as a curve 101. The curve 101 is nearer the origin side than the curve 102 is. Namely, in consideration of the losses in the diode bridge, an area capable of reducing the losses expands further when a high-breakdown-voltage element is employed than when a low-breakdown-voltage element is employed.

In consideration of the losses in the diode bridge, Equation (9) is modified to Equation (14).

[Numeral 14]

$$fsw < \left[ Pd + \frac{1}{8}(VL - \Delta Vce) \cdot Icp \right] \bigg/ \left[ \left(\frac{2}{\pi}\right) \cdot \Delta Esw \right] \quad (14)$$

While an IGBT element has been used as a switching element of an inverter in the above description, the present invention is applicable in the same fashion with the use of other switching elements.

Moreover, the voltage obtained from the AC power supply 1 is not limited to have an effective value of 200 V. The present invention is applicable to a power supply having an effective value of 200 V to 240 V (referred to as a 200 V system power supply in the present invention), for example.

(B2) Modularizing of Diode Bridge and Inverter

The use of a high-breakdown-voltage element for an inverter has the advantage of requiring a smaller current value, as described above. However, an inverter using a high-breakdown-voltage element has a higher input voltage than an inverter using a low-breakdown-voltage element. It is therefore required that the lines between the diode bridge and the inverter be insulated from the surroundings with a high breakdown voltage.

Figure 9:
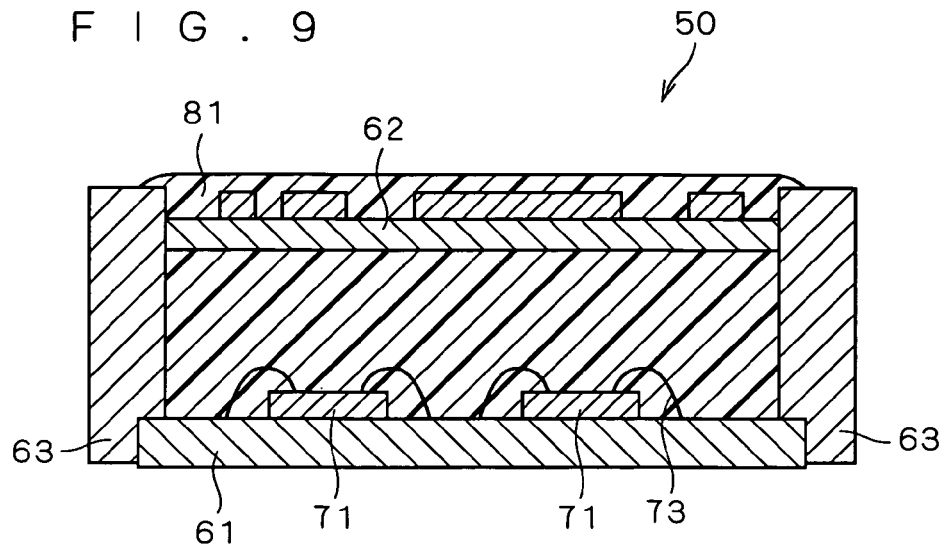
FIG. 9 is a cross-sectional view illustrating a module structure.

In view of the foregoing, it is desirable that the diode bridge and the inverter be integrated as a module. FIG. 9 is a cross-sectional view illustrating a module structure disclosed in the patent document 2. Electric components within an electric motor controlling module 50 are mounted on a print substrate 62 and an aluminum substrate 61 that are vertically disposed almost in parallel with each other. The lines of the print substrate 62 and aluminum substrate 61 are connected via a resin-molded circuit plate 63. Power components 71 (which handle a little over ten watts of power) such as a diode and a power transistor in the electric motor controlling module 50 are all bare chip mounted on the aluminum substrate 61. On the other hand, an intra-module CPU formed of a one chip microcomputer including a microprocessor, a ROM, and various kinds of interfaces should be cut off from heat generation and noise by other electric components, and is therefore mounted on the print substrate 62 on which components with a great amount of heat generation are not mounted. Control components with no (or a little amount of) heat generation are also mounted on the print substrate 62. A molding material 81 covers the power components 71, a bonding wire 73, and the other components on the aluminum substrate 61. The molding material 81 covers the components on the print substrate 62 as well. Modularizing a diode bridge and an inverter is especially effective in a high-breakdown-voltage element, as discussed above.

While the invention has been shown and described in detail, the foregoing description is in all aspects illustrative and not restrictive. It is therefore understood that numerous modifications and variations can be devised without departing from the scope of the invention.

The invention claimed is:

1. A method of designing a current supply circuit applied with an AC voltage of a predetermined effective value voltage to output a polyphase AC current to a polyphase load of a predetermined rated power, said current supply circuit comprising a polyphase inverter circuit, said polyphase inverter circuit including series connection of two switching elements for each phase, and outputting said AC current of each phase from a node of said series connection, and said method comprising the steps of:
(a) setting a current value as a rated current value of said polyphase inverter circuit, said current value being obtained by dividing said rated power of said polyphase load by a voltage value being twice said effective value voltage; and
(b) selecting said switching element having a second breakdown voltage based on said rated current value, said second breakdown voltage being twice a first breakdown voltage required of said switching element when a DC voltage obtained by performing full-wave rectification on said AC voltage is input to said polyphase inverter circuit, wherein said switching element is an IGBT element, and in said step (b),
an increment of turn-on losses in rated current value of said IGBT element having said second breakdown voltage with reference to turn-on losses in rated current value of said IGBT element having said first breakdown voltage is defined as a divisor,
the product of a first value, a second value, and a third value is defined as a dividend, said first value being obtained by subtracting an increment of a saturation voltage of said IGBT element having said second breakdown voltage with reference to a saturation voltage of said IGBT element having said first breakdown voltage from said saturation voltage, said second value being a maximum value of an output current of said inverter in terms of sinusoidal wave, and said third value being π/16, and
said IGBT element having said second breakdown voltage is selected in an area with a lower switching frequency of said inverter than the result obtained by dividing said dividend by said divisor.

2. A method of designing a current supply circuit applied with an AC voltage of a predetermined effective value voltage to output a polyphase AC current to a polyphase load of a predetermined rated power, said current supply circuit comprising a polyphase inverter circuit, said polyphase inverter circuit including series connection of two switching elements for each phase, and outputting said AC current of each phase from a node of said series connection, and said method comprising the steps of:
(a) setting a current value as a rated current value of said polyphase inverter circuit, said current value being obtained by dividing said rated power of said polyphase load by a voltage value being twice said effective value voltage; and
(b) selecting said switching element having a second breakdown voltage based on said rated current value, said second breakdown voltage being twice a first breakdown voltage required of said switching element when a DC voltage obtained by performing full-wave rectification on said AC voltage is input to said polyphase inverter circuit, wherein said AC voltage of said predetermined effective value voltage is a single phase, and said current supply circuit further comprises a voltage doubler rectifying circuit performing voltage doubler rectification on said AC voltage of said predetermined effective value voltage to output a rectified voltage to said polyphase inverter circuit, said switching element is an IGBT element, and in said step (b), an increment, multiplied by a factor of $2/\pi$, of turn-on losses in rated current value of said IGBT element having said second breakdown voltage with reference to turn-on losses in rated current value of said IGBT element having said first breakdown voltage is defined as a divisor, a value is defined as a dividend, said value being obtained by adding losses for one diode included in said voltage doubler rectifying circuit to the product of a first value, a second value, and a third value, said first value being obtained by subtracting an increment of a saturation voltage of said IGBT element having said second breakdown voltage with reference to a saturation voltage of said IGBT element having said first breakdown voltage from said saturation voltage, said second value being a maximum value of an output current of said inverter in terms of sinusoidal wave, and said third value being $1/8$, and said IGBT element having said second breakdown voltage is selected in an area with a lower switching frequency (fsw) of said inverter than the result obtained by dividing said dividend by said divisor.

3. The method of designing a current supply circuit according to claim 1, wherein said inverter has said switching frequency set to 7 kHz or less.

\* \* \* \* \*